United States Patent
Jin et al.

(10) Patent No.: US 11,620,213 B2
(45) Date of Patent: Apr. 4, 2023

(54) APPARATUS AND METHOD FOR HANDLING DATA STORED IN A MEMORY SYSTEM

(71) Applicant: SK hynix Inc., Gyeonggi-do (KR)

(72) Inventors: Byoung Min Jin, Gyeonggi-do (KR); Soong Sun Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/345,680

(22) Filed: Jun. 11, 2021

(65) Prior Publication Data

US 2022/0229772 A1   Jul. 21, 2022

(30) Foreign Application Priority Data

Jan. 15, 2021   (KR) .................. 10-2021-0005887

(51) Int. Cl.
  *G06F 12/02* (2006.01)
  *G06F 13/16* (2006.01)
  *G06F 12/06* (2006.01)

(52) U.S. Cl.
  CPC ...... *G06F 12/0238* (2013.01); *G06F 12/0292* (2013.01); *G06F 12/0653* (2013.01); *G06F 13/1668* (2013.01); *G06F 2212/7201* (2013.01)

(58) Field of Classification Search
  None
  See application file for complete search history.

(56) References Cited

U.S. PATENT DOCUMENTS

| | | | |
|---|---|---|---|
| 9,058,268 B1* | 6/2015 | Ostiguy | G06F 12/0802 |
| 9,619,170 B2 | 4/2017 | Hashimoto et al. | |
| 10,031,857 B2 | 7/2018 | Menachem et al. | |
| 2007/0016754 A1* | 1/2007 | Testardi | G06F 3/0611 |
| | | | 711/206 |
| 2014/0281151 A1 | 9/2014 | Yu et al. | |
| 2020/0081830 A1* | 3/2020 | Desai | G06F 12/0246 |

* cited by examiner

*Primary Examiner* — Charles J Choi
(74) *Attorney, Agent, or Firm* — IP & T Group LLP

(57) ABSTRACT

A controller configures a map table including a map entry associating different address schemes with each other. The controller is configured, for performing map table configuration, to find a target map entry among previous map entries in the map table, merge the current map entry into the target map entry to generate a merged map entry when the target map entry is found, and store the merged map entry in the map table. The target map entry and a current map entry include at least some information which is overlapped.

17 Claims, 12 Drawing Sheets

APPARATUS AND METHOD FOR HANDLING DATA STORED IN A MEMORY SYSTEM

CROSS-REFERENCE TO RELATED APPLICATIONS

This patent application claims the benefit of Korean Patent Application No. 10-2021-0005887, filed on Jan. 15, 2021, the entire disclosure of which is incorporated herein by reference.

TECHNICAL FIELD

One or more embodiments of the present disclosure described herein relate to an apparatus and method for handling data stored in a memory system.

BACKGROUND

Recently, a paradigm for a computing environment has shifted to ubiquitous computing, which enables computer systems to be accessed virtually anytime and anywhere. As a result, the use of portable electronic devices (e.g., mobile phones, digital cameras, notebook computers, or the like) are rapidly increasing. Such portable electronic devices each may use or include a memory system having at least one memory device. The memory system may be a data storage device. The data storage device can be used as a main storage device or an auxiliary storage device of a portable electronic device.

Unlike a hard disk, such a data storage device uses non-volatile semiconductor memories, exhibits improved stability and durability, has no mechanical driving parts (e.g., a mechanical arm), and thus provides high data access speeds and relatively low power consumption. Examples of the data storage device having such advantages include, but are not limited to, Universal Serial Bus (USB) memory devices, memory cards having various interfaces, solid state drives (SSDs), and so on.

BRIEF DESCRIPTION OF THE DRAWINGS

The description herein makes reference to the accompanying drawings wherein like reference numerals refer to like parts throughout the figures.

DETAILED DESCRIPTION

Figure 1:
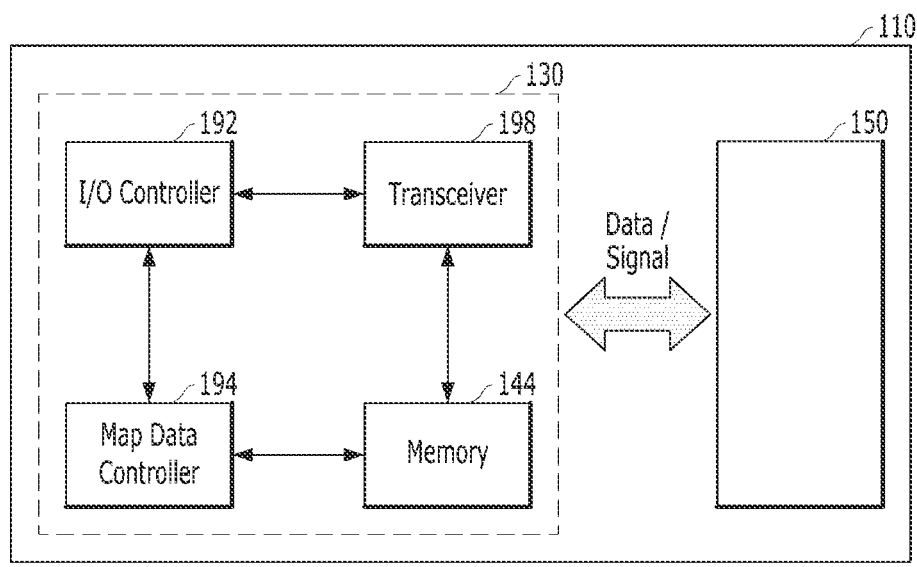
FIG. 1 illustrates a memory system according to an embodiment of the present disclosure.

Various embodiments of the present disclosure are described below with reference to the accompanying drawings. Elements and features of the present disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or a portion of a processor and its (or their) accompanying software and/or firmware. The term "circuitry" also covers, for example, and if applicable to a particular claim element, an integrated circuit for a storage device.

As used herein, these terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

An embodiment of the present disclosure can provide a data processing system and a method for operating the data processing system. The data processing system includes components and resources such as a memory system and a host, and is capable of dynamically allocating plural data paths used for data communication between the components based on usages of the components and the resources.

In an embodiment of the present disclosure, a memory system can combine or merge map information when at least a part of logical addresses is overlapped or is contiguous in the map information associating a logical address used by a host with a physical address used in a non-volatile memory device, so that the memory system can efficiently manage or control the map information.

Further, in an embodiment of the present disclosure, a memory system can reduce the number of operations for reading, modifying, or storing map information from or to a non-volatile memory device by sequentially combining or merging the map information which is used for coupling different addresses provided from different address schemes. It is possible to provide an apparatus and method capable of reducing overheads due to internal operations that may occur in data input/output operation performed in the memory system.

In an embodiment, a controller can configure a map table including a map entry associating different address schemes with each other. The controller can be suitable for searching previous map entries for a target map entry; merging the current map entry into the target map entry to generate a merged map entry when the target map entry is found; and adding the merged map entry in the map table. The target map entry and a current map entry can include at least some information which is overlapped.

The target map entry can further include at least some information which is continuous with that of the current map entry. The controller can search for the target map entry by performing a sequential retrieval among a second half of the previous map entries to find the target map entry when the previous map entries in the map table are not sorted in a logical address order. The controller can search for the target map entry by performing a binary search on the previous map entries when the previous map entries in the map table are sorted in the logical address order.

The controller can be further suitable for adding the current map entry in the map table when the target map entry is not found.

The controller can be further suitable for comparing the current map entry with a specific previous map entry among the previous map entries; shift all of the specific previous map entry to a last previous map entry among the previous map entries to secure an empty space when a logical address of the current map entry is ahead of that of the specific previous map entry; and inserting the current map entry into the empty space.

The controller can be further suitable for inserting the current map entry into an empty space next to the specific previous map entry when a logical address of the specific previous map entry is ahead of that of the current map entry.

The controller can be suitable for configuring the map table in response to a trim command provided from a host.

The controller can be suitable for configuring the map table when the map table has no available space for a new map entry, or when the new map entry is added to the map table.

The controller can be suitable for storing the map table in a non-volatile memory device after configuring the map table.

In another embodiment, a memory system can include a memory device configured to store or output data based on a first address scheme; a controller configured to receive or output the data based on a second address scheme which is different from the first address scheme, and configure a map table including a map entry associating the first and second address schemes with each other. The controller can be suitable for searching previous map entries in the map table for a target map entry among previous map entries in the map table, wherein the target map entry and a current map entry include at least some information which is overlapped; merging the current map entry into the target map entry to generate a merged map entry when the target map entry is found; and adding the merged map entry in the map table.

The target map entry can further include at least some information which is continuous with that of the current map entry. The controller can search for the target map entry by performing a sequential retrieval among a second half of the previous map entries when the previous map entries in the map table are not sorted in a logical address order. The controller can search for the target map entry by performing a binary search on the previous map entries when the previous map entries are sorted in the logical address order.

The controller can be further suitable for adding the current map entry in the map table when the target map entry is not found.

The controller can be further suitable for comparing the current map entry with a specific previous map entry among the previous map entries; shifting all of the specific previous map entry to a last previous map entry to secure an empty space when a logical address of the current map entry is ahead of that of the specific previous map entry; and inserting the current map entry into the empty space.

The controller can be further suitable for inserting the current map entry into an empty space next to the specific previous map entry when a logical address of the specific previous map entry is ahead of that of the current map entry.

The controller can be suitable for configuring the map table in response to a trim command provided from a host.

The controller can be suitable for configuring the map table when the map table has no available space for a new map entry, or when the new map entry is added to the current map table.

The controller can be suitable for storing the map table in a non-volatile memory device after configuring the map table.

In another embodiment, a method is provided for operating a memory system comprising a memory device configured to store or output data based on a first address scheme, and a controller configured to receive or output the data based on a second address scheme which is different from the first address scheme, and configure a map table including a map entry associating the first and second address schemes with each other. The method can include searching previous map entries in the map table for a target map entry, wherein the target map entry and a current map entry include at least some information which is overlapped; merging the current map entry into the target map entry to generate a merged map entry when the target map entry is found; and adding the merged map entry in the map table.

The target map entry can further include at least some information which is continuous with that of the current map entry. The searching for the target map entry can include at least one of: performing a sequential retrieval among a second half of the previous map entries when the previous map entries are not sorted in a logical address order, or performing a binary search on the previous map entries when the previous map entries are sorted in the logical address order.

The method can further include adding the current map entry in the map table when the target map entry is not found.

The adding the current map entry can include comparing the current map entry with a specific previous map entry among the previous map entries; shifting all of the specific previous map entry to a last previous map entry to secure an empty blank space and inserting the current map entry into the empty space, when a logical address of the current map entry is ahead of that of the specific previous map entry; and inserting the current map entry into an empty space next to the specific map entry when a logical address of the specific previous map entry is ahead of that of the current map entry.

In another embodiment, an operating method of a controller can include controlling a nonvolatile memory device to perform an operation for generating a logical-to-physical (L2P) map table including L2P map entries each including information of one or more consecutive and non-overlapping logical addresses; and reconfiguring, in response to a trim request, the L2P map table by: generating a combined L2P map entry through merge of valid map entries including information of one or more overlapping logical addresses among the L2P map entries, the combined L2P map entry including information of two or more consecutive and non-overlapping logical addresses, and arranging a sequence of the combined L2P map entry and remaining and valid one or more of the L2P entries in an order of logical addresses represented thereby.

Embodiments of the present disclosure will now be described with reference to the accompanying drawings, wherein like numbers reference like elements.

FIG. 1 illustrates a memory system 110 according to an embodiment of the present disclosure.

Referring to FIG. 1, the memory system 110 may include a memory device 150 and a controller 130. The memory device 150 and the controller 130 may be physically separated from each other in the memory system 110. The memory device 150 and the controller 130 may be connected via at least one data path. For example, the data path may include a channel and/or a way. According to an embodiment, the memory device 150 and the controller 130 may be functionally divided. Further, according to an embodiment, the memory device 150 and the controller 130 may be implemented with a single chip or a plurality of chips.

Figure 2:
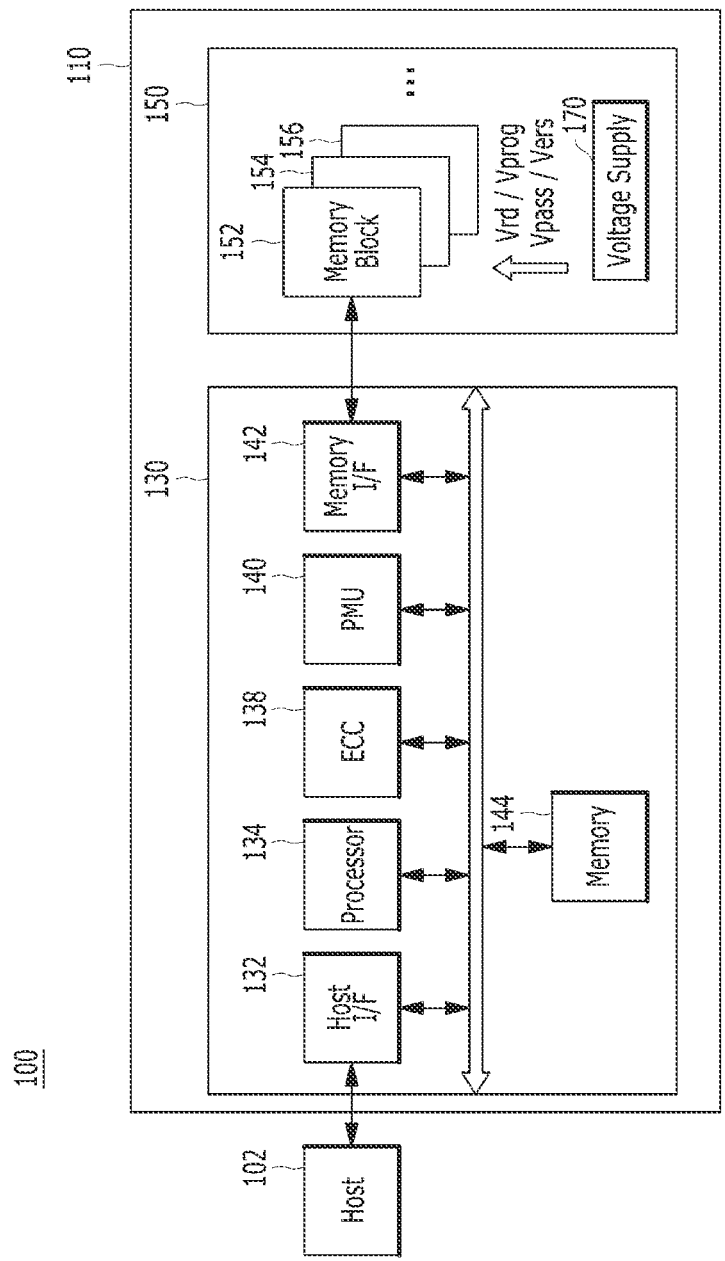
FIG. 2 illustrates a data processing system according to an embodiment of the present disclosure.

The memory device 150 may include a plurality of memory blocks 152, 154, 156 shown in FIG. 2. The memory block 152, 154, 156 may be understood as a group of non-volatile memory cells in which data is erased together during a single erase operation. The memory block 152, 154, 156 may include a plurality of pages. According to an embodiment, each page may be understood as a group of non-volatile memory cells in which data is stored together during a single program operation or read out together during a single read operation.

The memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data to be input to the non-volatile memory cells or data output from non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange data and a signal with the controller 130.

According to an embodiment, the memory device 150 may include at least one memory block, at least one memory plane, or at least one memory die. The internal configuration of the memory device 150 shown in FIG. 1 may be changed according to performance of the memory system 110. Therefore, embodiments are not limited to the internal configuration shown in FIG. 1.

Figure 3:
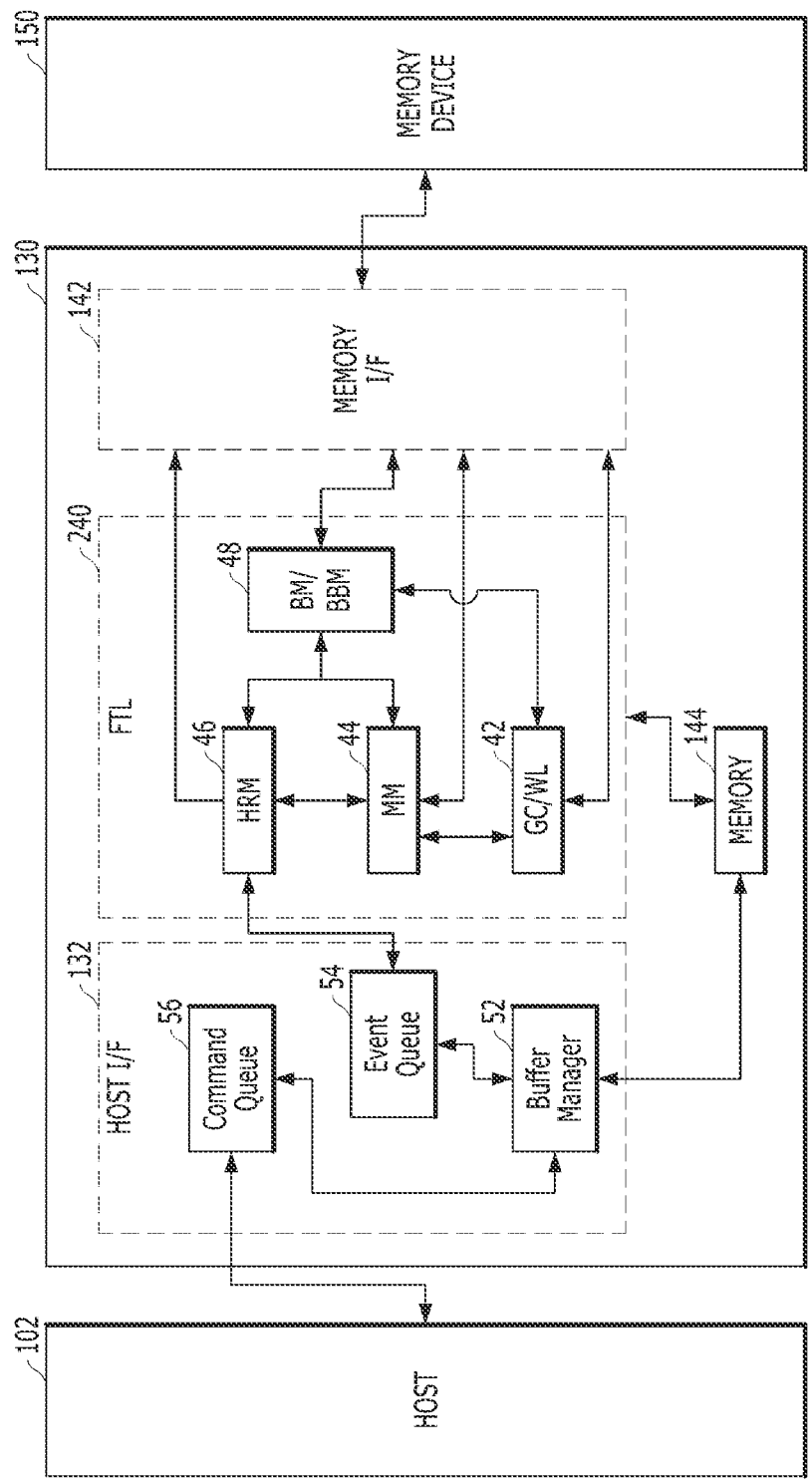
FIG. 3 illustrates a memory system according to an embodiment of the present disclosure.

In order to store data requested by an external device, e.g., a host 102 shown in FIGS. 2-3, in the memory device 150 (e.g., a storage space including non-volatile memory cells), the memory system 110 may perform address translation between a file system used by the host 102 and a physical location of the storage space including the non-volatile memory cells. For example, a data address determined according to the file system used by the host 102 may be called a logical address or a logical block address, while an address for the physical location at which data is to be stored in the storage space may be referred to as a physical address or a physical block address.

When the host 102 transfers a logical address to the memory system 110 together with a read request, the memory system 110 searches for a physical address associated with the logical address, reads data stored at a physical location recognized by the physical address, and outputs read data to the host 102. During this procedure, the address translation may be performed in the memory system 110 to search for the physical address associated with the logical address input from the host 102.

The controller 130 may perform a data input/output operation in response to a request input from the external device. For example, when the controller 130 performs a read operation in response to a read request input from the external device, data stored in a plurality of non-volatile memory cells included in the memory device 150 is transferred to the controller 130. In the read operation, an input/output (I/O) controller 192 may perform address translation between a logical address input from the external device and a physical address, and then transmit, to the memory device 150, the physical address and a read command corresponding to the read request through a transceiver 198. The transceiver 198 may transmit the physical address and the read command to the memory device 150 and receive data output from the memory device 150 corresponding to the physical address. The transceiver 198 may temporarily store the data transferred from the memory device 150 in a memory 144. The I/O controller 192 may output the data stored in the memory 144 to the external device in response to the read request.

In addition, the I/O controller 192 may transmit write data input along with a write request from the external device to the memory device 150 through the transceiver 198. After storing the write data in the memory device 150, the I/O controller 192 may transmit a response corresponding to the write request to the external device. The I/O controller 192 may generate or update map data that associates a physical address, which indicates a location where the write data is stored in the memory device 150, with a logical address input along with the write request.

When the I/O controller 192 performs the data input/output operation, a map data controller 196 controls or manages map data used by the controller 130. The map data may include plural map data items, each of which may associate a logical address with a physical address, or vice versa. The map data or the map data item can be used as operation information for the data input/output operation performed by the controller 130. For example, the I/O controller 192 may use the map data for address translation, and map data items may be updated or generated after write data corresponding to a write request is programmed in the memory device 150.

According to an embodiment, the map data may be classified into first map data (e.g., a Logical to Physical (L2P) table) for associating a logical address with a physical address and second map data (e.g., a Physical to Logical (P2L) table) for associating a physical address with a logical address. For example, the map data controller 196 may configure the first map data or the second map data that is loaded or stored in the memory 144 from the memory device 150.

According to an embodiment, a map data item included in the first map data or the second map data stored in the memory device 150 may associate a single logical address with a single physical address. A plurality of map data items may constitute a single map segment. For example, the map segment may correspond to a group of map data items stored in, or read from, the memory device 150 together. After the controller 130 reads at least some portion of the first map data or the second map data from the memory device 150 and stores the read map data in the memory 144, the controller 130 may utilize the map data stored in the memory 144 to perform data input/output operations. The storage capacity of the memory 144 in the memory system 110 may be limited, and thus a memory space of the memory 144 that is allocated for temporarily storing the first map data or the second map data, each of the first map data and the second map data including plural map data items, may be limited. Therefore, the number of map data items included in the first map data or the second map data may also be limited.

According to an embodiment, the L2P map table including plural L2P map entries each for associating at least one logical address with at least one physical address, may be stored in the memory device 150. The controller 130 may generate the P2L map table including plural P2L map entries each for associating the physical address with the logical address, during the data input/output operations.

For example, after the controller 130 programs new user data to the memory device 150, the controller 130 may generate a P2L map entry for linking a physical address, which indicates the location where the new user data is programmed in the memory device 150, to a logical address input from the host 102 and corresponding to the new user data. The P2L map entry may indicate a recent location of the new user data stored in the memory device 150.

In one case, the L2P map table loaded in the memory 144 includes a L2P map entry indicating that a specific logical address (e.g., '0A0') and a first physical address (e.g., '123') are associated with each other.

After the controller 130 performs a program operation for new user data corresponding to the specific logical address (e.g., '0A0'), the controller 130 may generate a P2L map entry and store it in the memory 144. The P2L map entry may associate the logical address (e.g., '0A0') with a second physical address (e.g., '876') indicating the location where the new user data is stored in the memory device 150. In this case, the controller 130 may recognize that the L2P map entry included in the L2P map table is old and the P2L map entry is the latest, i.e., recognize that the P2L map entry is the most recent map information. After that, the controller 130 may update the L2P map table stored in the memory device 150 based on the P2L map entry.

As described above, the controller 130 may perform a map flush operation (e.g., an operation for updating the L2P map table stored in the memory device 150) periodically, intermittently, or as needed. After the map flush operation is performed, the P2L map table including the P2L map entry stored in the memory 144 may be deleted or destroyed. When an operation for programming user data in the memory device 150 is performed after the map flush operation is performed, the controller 130 may generate a new P2L map table.

When the memory system 100 performs a data input/output operation, a new map entry may be generated and stored in the memory device 150. For example, when a data item is stored or deleted in the memory device 150 or when the memory system 110 performs garbage collection, a new L2P map entry can be generated and the new L2P map entry can be added to the L2P map table stored in the memory device 150. As L2P map entries are sequentially added to the L2P map table, the size of the L2P map table can increase, and a plurality of L2P map entries may be mixed up. In order for the memory system 110 to efficiently control the map data, the map data controller 196 may re-configure the L2P map table stored in the memory device 150 after data input/output operations, the garbage collection or the like.

According to an embodiment, after the memory system 110 receives a trim command, the L2P map table may be configured (or reconfigured) in response to the trim command. According to an embodiment, the trim command is a type of command transmitted to the memory system 110 by an external device (e.g., a host). The trim command can be used for practically erasing a data item stored in the memory system 110. The trim command can be distinguished from an erase command which is used for discarding or invalidating a data item stored in the memory system 110. Depending on an embodiment, the trim command may be divided into a plurality of detailed commands, and an internal operation of the memory system 110 for deallocating a space in which data items in the memory device 150 are stored can be different according to the detailed commands.

When the host transmits an erase command to erase a data item, the data item stored in the memory system 110 is not practically erased, but a map entry (e.g., a first map entry), which is meta data associated with the data item, can be erased so that an erase operation corresponding to the erase command can be achieved. When the memory system 110 deletes the map entry, the data item remaining in the memory device 150 can become invalid data. When the L2P map entry for data stored in the memory device 150 is erased, the memory system 110 could not output the data item which remains in the memory device 150 to the host even if the host transmits a logical address to the memory system 110. Although invalid data may increase in the memory device 150, the invalid data which remains in the memory device 150 might not be practically erased until garbage collection is performed.

When the memory device 150 does not perform garbage collection or is in an environment where it is difficult to perform garbage collection, a space for storing/programming a new data item in the memory device 150 may become reduced. In this case, before the memory system 110 programs a new data item into the memory device 150, the memory system 110 can first perform an erase operation of erasing a memory block in which invalid data remains, to secure a free memory block. Because the erase operation is performed before the memory system 110 programs the new data item into the memory device 150, the program operation performance of the memory system 110 for the new data item may be degraded. According to an embodiment, the trim command can be used to avoid this issue.

When the host determines that a data item remaining in the memory system 110 is invalid data (e.g., garbage data), the host might transmit the trim command with a logical address associated with the data item. The memory system 110 may erase the data item stored in the memory device 150 in response to the trim command. In addition, the memory system 110 can move or copy another data item (e.g., a valid data item stored in the same memory block as the erased data) with an accompanying operation for updating associated map data. When the map data is updated, the map data controller 196 may configure the L2P map table stored in the memory device 150.

In order to configure the L2P map table, the map data controller 196 can merge or combine some overlapping or consecutive first map entries included in the L2P map table. A method for configuring the L2P map table will be described later with reference to FIGS. 5 to 13.

Hereinafter, descriptions will be made focusing on operations or components that can be technically distinguished between the controller 130 and the memory device 150 described in FIG. 1 and FIGS. 2 to 4. Specifically, a flash translation layer (FTL) 240 in the controller 130 will be described in more detail with reference to FIGS. 3 to 4. According to an embodiment, roles and functions of the flash conversion layer (FTL) in the controller 130 may be varied.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 1, the memory device 150 may include a plurality of memory blocks 152, 154, 156 shown in FIG. 2. The memory block 152, 154, 156 may be understood to be a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood to be a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIG. 1 may be different according to performance of the memory system 110. An embodiment of the present disclosure is not limited to the internal configuration shown in FIG. 2.

Referring to FIG. 2, the memory device 150 may include a voltage supply circuit capable of supplying at least some voltage into the memory block 152, 154, 156. The voltage supply circuit may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit may supply the read voltage Vrd into a selected non-volatile memory cell. During the program operation for storing data in the non-volatile memory cell included in the memory block 152, 154, 156, the voltage supply circuit may supply the program voltage Vprog into a selected non-volatile memory cell. Also, during a read operation or a program operation performed on the selected nonvolatile memory cell, the voltage supply circuit may supply a pass voltage Vpass into a non-selected nonvolatile memory cell. During the erasing operation for erasing data stored in the non-volatile memory cell included in the memory block 152, 154, 156, the voltage supply circuit may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data item may be required. The memory device 150 may include a table including information corresponding to plural levels of the read voltage Vrd, corresponding to the multi-bit data item. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102. For example, the host 102 and the memory system 110 may use a predetermined communication standard or interface to transmit and receive data therebetween. Examples of standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL).

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA Interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in a host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal (e.g., a correction success signal or a correction fail signal), based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. The hard decision decoding in which a value output from a non-volatile memory cell is coded as 0 or 1. Compared to the hard decision decoding, the soft decision decoding can determine the value stored in the non-volatile memory cell based on the stochastic information. Regarding bit-flipping (which may be considered an error that can occur in the memory device 150), the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code (for example, a Hamming code) in two or three dimensions and repeat decoding in a row direction and a column direction to improve reliability of values.

The power management unit (PMU) 140 may control electrical power provided to the controller 130. The PMU 140 may monitor the electrical power supplied to the memory system 110 (e.g., a voltage supplied to the controller 130) and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data input from the host 102 in the memory 144 before programming the write data in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Moreover, as a background operation that is performed without a command transmitted from the host 102, the controller 130 can perform garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform a parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered as an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data (e.g., two or more bits of data). The MLC memory block may have larger storage capacity for the same space compared to the SLC memory block. The MLC memory block can be highly integrated in view of storage capacity.

In an embodiment, the memory device 150 may be implemented with MLC memory blocks such as a double level cell (DLC) memory block, a triple-level cell (TLC)

memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use an MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored another-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events inputting to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In an embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and currently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
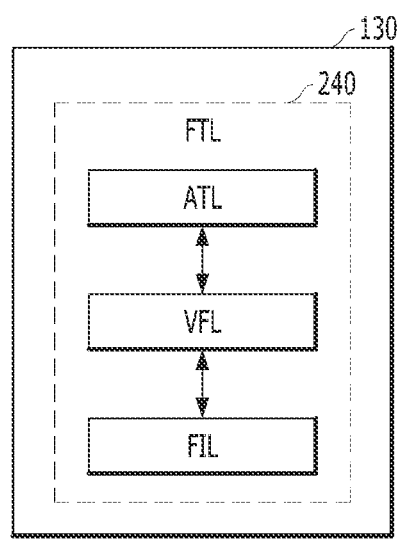
FIG. 4 illustrates internal configuration included in a controller shown in FIGS. 1 to 3 according to an embodiment of the present disclosure.

FIG. 4 illustrates internal configuration of the controller shown in FIG. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information to which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through such recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
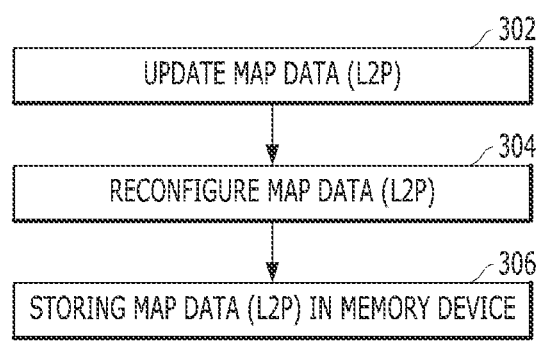
FIG. 5 illustrates a method for operating a memory system according to an embodiment of the present disclosure.
Figure 6:
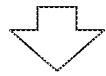
FIGS. 6A to 6C illustrate examples of a method for controlling map data in a memory system according to an embodiment of the present disclosure.

FIG. 5 illustrates a method for operating a memory system according to an embodiment of the present disclosure.

Referring to FIG. 5, a method for operating a memory system can include updating L2P map table (operation 302), reconfiguring the L2P map table (operation 304), and storing the reconfigured L2P map table in the memory device 150 (operation 306).

Referring to FIGS. 1 and 5, the updating the L2P map table (operation 302) may be performed in response to a data input/output operation performed by the memory system 110. For example, when the memory system 110 programs a new data item into the memory device 150 or erases a data item stored in the memory device 150, the L2P map table may be updated. In addition, in response to the trim command transmitted from the host 102, the memory system 110 may update the L2P map table.

In operation 304, the memory system 110 may configure the L2P map table after updating the L2P map table. If the memory system 110 configures the L2P map table whenever updating the L2P map table, overheads could be caused by internal operations of the memory system 110 for configuring the L2P map table. Accordingly, to reduce the overheads, an operation for the L2P map table configuration may be performed by the memory system 110 in response to the trim command. According to an embodiment, the memory system 110 may configure the L2P map table after garbage collection is performed. The memory system 110 can use the memory 144, shown in FIGS. 1 to 3, for the L2P map table configuration. When the L2P map table is configured, the memory system 110 may store the configured L2P map table in the memory device 150 (operation 306).

While the memory system 110 performs a data input/output operation, the memory system 110 can generate a map entry, add generated map entry to the L2P map table, or delete or invalidate a map entry stored in the L2P map table. When logical addresses of the map entries in the L2P map table are completely overlapped with each other, a previous or old map entry could be invalidated. However, even if a plurality of map entries in the L2P map table are valid, timings of generating map entries in the L2P map table and adding generated map entries to the L2P map table may be different from each other. Further, logical addresses included in the map entries can be contiguous with each other, or the logical addresses in the map entries may be partially overlapped.

When logical addresses of map entries in the L2P map table are consecutive or partially overlapped, the memory system 110 may combine or merge the corresponding map entries. The memory system 110 can load the L2P map table stored in the memory device 150 into the memory 144, and then find a target map entry that could be merged or combined with another map entry which would be added into the L2P map table. Herein, how the memory system 110 can determine which map entries can be combined or merged with each other, or which map entry is the target map entry, will be described later with reference to FIGS. 6A to 6C. Hereinafter, although a L2P map entry of a L2P map table includes a logical address and a corresponding physical address, omitted in following figures may be an illustration of the physical address in the L2P map entry for clear description.

FIGS. 6A to 6C illustrate examples of a method for controlling map data in a memory system according to an embodiment of the present disclosure. Herein, all map entries included in the L2P map table are valid. For example, the controller 130 in the memory system 110 can load the L2P map table stored in the memory device 150 into the memory 144. For the loaded L2P map table into the memory 144 for data input/output operations, the memory system 110 can be determined whether map entries in the L2P map table can be combined or merged with each other.

Referring to FIG. 6A, a first example of map entries that can be combined or merged by the memory system 110 will be described. The L2P map table may include plural map entries (map entries). Each map entry may include a start logical address SLBA and the number of consecutive logical addresses NLB. In a first map entry, a start logical address SLBA is '0' and the number of consecutive logical addresses NLB is '2'. This may indicate that the first map entry is associated with two logical addresses LBAs of '0' and '1'. In a second map entry, a start logical address SLBA is '2' and the number of consecutive logical addresses NLB is '2'. This may indicate that the second map entry is associated with two other logical addresses LBAs of '2' and '3'. The memory system 110 can determine that the second map entry is continuous with the first map entry so that the first map entry and the second map entry can be combined or merged. In this disclosure, when logical addresses represented by arbitrary first and second entries are consecutive, the first and second map entries are determined as continuous with each other. In this disclosure, when partial or whole logical addresses represented by arbitrary first and second entries overlap, the first and second map entries are determined as partially or wholly overlapping. In a combined or merged map entry, a start logical address SLBA can be '0' and the number of consecutive logical addresses NLB can be '4'.

In a third map entry, the start logical address SLBA is '50' and the number of consecutive logical addresses NLB is '1'. This may indicate that the third map entry is associated with a logical address LBA of '50'. The memory system 110 can determine that the third map entry is neither continuous nor overlapped with the first map entry or the second map entry, so that the third map entry may not be combined or merged with another map entry.

In addition, in a fourth map entry, a start logical address SLBA is '100' and the number of consecutive logical addresses NLB is '3'. This may indicate that the fourth map entry is associated with logical addresses LBAs of '100', '101' and '102'. In a fifth map entry, a start logical address SLBA is '103' and the number of consecutive logical addresses NLB is '5'. This may indicate that the fifth map entry is associated with logical addresses LBAs of '103' to '107'. Similar to the first map entry and the second map entry which are combined with each other, the memory system 110 can determine that the fifth map entry is continuous with the fourth map entry, so that the memory system 110 can combine or merge the fourth and fifth map entries. In a combined or merged map entry, a start logical address SLBA may be '100' and the number of consecutive logical addresses NLB may be '8'.

FIG. 6A shows that, when the memory system 110 determines that adjacent map entries can be continuous with each other, the memory system 110 can merge or combine the corresponding entries. On the other hand, FIG. 6B shows an example in which a conventional memory system cannot combine or merge map entries in a L2P map table, which is different from that of FIG. 6A.

Referring to FIG. 6B, a first map entry in the L2P map table has a start logical address SLBA of '0' and the number of consecutive logical addresses NLB of '2'. This may indicate that the first map entry is associated with two logical addresses LBAs of '0' and '1'. In a second map entry, a start logical address SLBA is '1' and the number of consecutive logical addresses NLB is '3'. This may indicate that the second map entry is associated with three logical addresses LBAs of '1', '2' and '3'. The first map entry and the second map entry are not contiguous, but are partially overlapped with each other because the first map entry and the second map entry can include map information regarding the logical address LBA of '1'. The conventional memory system did not combine or merge the first map entry and the second map entry which are partially overlapped with each other.

In addition, in a third map entry, a start logical address SLBA is '103' and the number of consecutive logical addresses NLB is '5'. This may indicate that the third map entry is associated with logical addresses LBAs of '103' to '107'. In a fifth map entry, a start logical address SLBA is '100' and the number of consecutive logical addresses NLB is '3'. This may indicate that the fifth map entry is associated with three logical addresses LBAs of '100', '101' and '102'. Because the third map entry and the fifth map entry are not adjacent to each other, the conventional memory system cannot merge or combine the third and fifth map entries even if the fifth map entry is continuous with the fourth map entry.

FIG. 6C illustrates that the memory system 110 according to an embodiment of the present disclosure can solve an issue of the conventional memory system in which map entries in the L2P map table described in FIG. 6B could not be combined or merged.

Referring to FIG. 6C, a first map entry having the entry index '0' in the L2P map table has a start logical address SLBA of '0' and the number of consecutive logical addresses NLB is '2'. This may indicate that the first map entry having the entry index '0' is associated with two logical addresses LBAs of '0' and '1'. In a second map entry having the entry index '1', a start logical address SLBA is '1' and the number of consecutive logical addresses NLB is '3'. This may indicate that the second map entry having the entry index '1' is associated with three logical address LBAs for '1', '2' and '3'. The first map entry having the entry index '0' and the second map entry having the entry index '1' are not contiguous, but partially overlapped with each other because the first map entry having the entry index '0' and the second map entry having the entry index '1' can include map information regarding the logical address LBA of '1'. The memory system 110 may combine or merge the first map entry having the entry index '0' and the second map entry having the entry index '1' to generate a new combined or merged map entry. For example, the first map entry having the entry index '0' is merged into the second map entry having the entry index '1'. In the new combined or merged map entry, a start logical address SLBA may be '0' and the number of consecutive logical addresses NLB may be '4'.

In addition, in a third map entry having the entry index '2', a start logical address SLBA is '100' and the number of consecutive logical addresses NLB is '3'. This may indicate that the third map entry having the entry index '2' is associated with three logical addresses LBAs of '100', '101' and '102'. A fifth map entry having the entry index '4' has a start logical address SLBA of '103' and the number of consecutive logical addresses NLB of '5'. This may indicate that the fifth map entry having the entry index '4' is associated with four logical address LBAs of '103' to '107'. In the memory system 110, the third map entry having the entry index '2' and the fifth map entry having the entry index '4' are not adjacent, but the third map entry having the entry index '2' and the fifth map entry having the entry index '4'. 4) can be combined or merged to generate a new combined or merged map entry. The new combined or merged map entry may have a start logical address SLBA of '100' and the number of consecutive logical addresses NLB of '8'.

As described above, when contiguous or partially overlapped map entries can be combined or merged, a space in which the combined or merged map entry is originally stored may be no longer valid (INVALID). According to an embodiment, the memory system 110 may combine or merge contiguous or partially overlapped map entries and sort map entries in the map data so that plural map entries can be sorted in an order of logical addresses.

Figure 7:
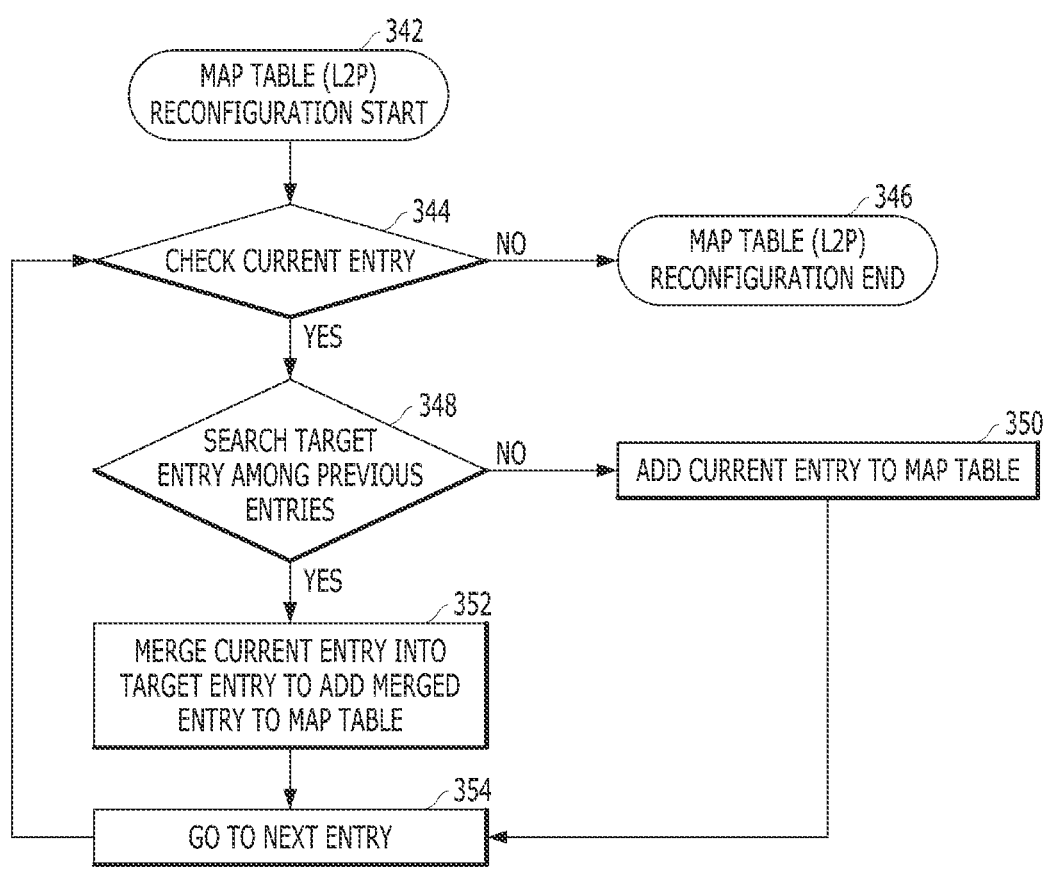
FIG. 7 illustrates a method for operating a memory system according to another embodiment of the present disclosure.

FIG. 7 illustrates a method for operating a memory system according to another embodiment of the present disclosure.

Referring to FIG. 7, a method for operating a memory system can include starting a L2P map table reconfiguration (operation 342), checking a current map entry in the L2P map table (operation 344), searching previous map entries including so-far-added/merged map entries in the L2P map table for a target map entry (operation 348), and combining or merging the current map entry and the target entry to add a combined or merged map entry to a new map table (operation 352). Herein, the previous map entries can include a previously merged and added map entry and a previously not-merged and added map entry in the new map table.

In operation 342, an operation of starting the L2P map table reconfiguration may be performed in response to a trim command input from an external device, as described with reference to FIG. 1. According to an embodiment, after the memory system 110 performs garbage collection, the L2P map table can be reconfigured.

To reconfigure the L2P map table, the memory system 110 may check the map entry included in the L2P map table (operation 344). When there is no current map entry for checking whether to reconfigure the map table (NO in 344), an operation of reconfiguring the L2P map table may be terminated (operation 346).

When there is a current map entry in the L2P table for the L2P map table reconfiguration (YES in operation 344), the memory system can search the so-far-added/merged map entries for the target map entry (operation 348). For example, if the current map entry is a first map entry in the L2P map table, there is no target map entry (NO in operation 348) because there is no so-far-added/merged map entry in the L2P map table. If the current map entry is a fourth map entry in the L2P map table, the so-far-added/merged map entries may include first to third map entries in the L2P map table. The memory system can search the first to third map entries for a target map entry. The memory system 110 may check whether there is a target map entry, as shown in examples described with reference to FIGS. 6A and 6C. The memory system 110 may sequentially check whether the current map entry is continuous with any of the so-far-added/merged map entries, or whether the current map entry is partially or completely overlapped with any of the so-far-added/merged map entries.

According to an embodiment, an operation of finding all so-far-added/merged map entries in the map table may, for a target map entry, cause an overhead. Since a so-far-added/merged map entry is closer than the current map entry, it may be highly probable that the so-far-added/merged map entry becomes a target map entry. Accordingly, to reduce overheads, the memory system can perform a sequential retrieval among a second half of the so-far-added/merged map entries to find the target map entry when the so-far-added/merged map entries in the current map table are not sorted into a logical address order.

According to an embodiment, the memory system 110 may perform a binary search to find a target entry among so-far-added/merged map entries. For example, a logical address of a so-far-added/merged map entry located in the middle (e.g., a position of ½) among the so-far-added/merged map entries in the map table may be compared with that of the current map entry. If the logical address of the current map entry is ahead of the logical address of the so-far-added/merged map entry located in the middle, a logical address of another so-far-added/merged map entry located in the middle among a first half of the so-far-added/merged map entries (e.g., a quarter position of the so-far-added/merged map entries) in the map table can be compared with the logical address of the current map entry. When the logical address of the so-far-added/merged map entry located in the middle is ahead of the logical address of the current map entry, a logical address of another so-far-added/merged map entry located in the middle among a second half of the so-far-added/merged map entries (e.g., a ¾ position of the so-far-added/merged map entries) in the map table can be compared with the logical address of the current map entry. As compared with the sequential retrieval for all so-far-added/merged map entries, the binary search can make the memory system 110 find a target map entry more effectively. The memory system 110 can reduce resource consumption for finding the target map entry which is to be combined with or merged into the current map entry. According to an embodiment, for performing the binary search, the memory system 110 may sort the so-far-added/merged map entries included in the map table based on the logical address (e.g., an ascending or descending order of logical address).

When the memory system 110 finds the target map entry among the so-far-added/merged map entries (YES in operation 348), the memory system 110 may merge or combine the current map entry and the target map entry and add the merged or combined map entry to a new map table (operation 352). Here, the new map table may be a map table that is being reconfigured and may be temporarily stored in a space allocated in the memory 144. When the configuration of the L2P map table is completed, the new map table temporarily stored in the memory 144 may be stored in the memory device 150.

When the memory system 110 does not find the target map entry among the so-far-added/merged map entries (NO in operation 348), the memory system 110 may add the current map entry to the new map table (operation 350). In an embodiment, the memory system 110 may sequentially add the current map entry to a location following the so-far-added/merged map entries in the new map table.

When the memory system 110 adds the current map entry to the new map table (operation 350), or combines or merges the current map entry and the target map entry and adds the combined or merged map entry to the new map table (operation 352), the memory system 110 checks a next map entry in the L2P map table (operation 354). When the current map entry was a sixth map entry, the memory system 110 can check whether there is a seventh map entry in the L2P map table (operation 344).

In the above-described method for operating the memory system, the memory system 110 may generate the merged or combined map entry when plural map entries (e.g., a current map entry and a target map entry among so-far-added/merged map entries) in the L2P map table are continuous, or at least partially overlapped, with each other. Even if the plural map entries are not adjacent to each other, the memory system can determine whether the plural map entries can be combined or merged. When it is determined that a current map entry can be combined with, or merged into, a target map entry, the memory system can generate the combined or merged map entry. Through this reconfiguration operation for the L2P map table, the memory system 110 may manage and control the L2P map table more efficiently.

Figure 8:
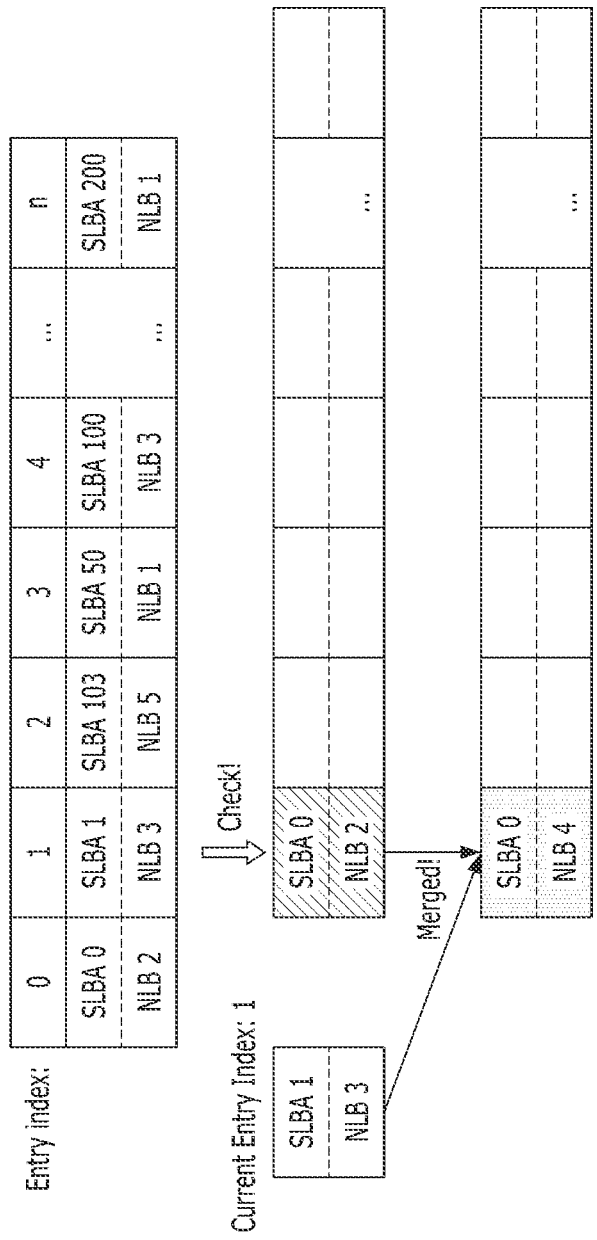
FIG. 8 illustrates a first example of merging map entries in a memory system according to an embodiment of the present disclosure.

FIG. 8 illustrates a first example of merging map entries in a memory system according to an embodiment of the present disclosure.

Referring to FIG. 8, the L2P map table stored in the memory device 150 includes (n+1) map entries. A first map entry having the entry index '0' in the L2P map table has a start logical address SLBA of '0' and the number of consecutive logical addresses NLB of '2'. This may indicate that the first map entry having the entry index '0' is associated with two logical addresses LBAs of '0' and '1'. First, the memory system 110 can recognize the first map entry having the entry index '0'. Based on the current map entry (i.e., the first map entry having the entry index '0'), the first map entry having the entry index '0' may be added to a new map table because there is no so-far-added/merged map entry. Then, the memory system 110 may check a next map entry in the map data.

Referring to FIG. 8, a second map entry having the entry index '1' becomes the current map entry. In the second map entry having the entry index '1', a start logical address SLBA is '1' and the number of consecutive logical addresses NLB is '3'. This may indicate that the second map entry having the entry index '1' is associated with three logical addresses LBAs of '1', '2' and '3'. Based on the second map entry having the entry index '1', the memory system 110 may check whether a so-far-added/merged map entry exists. After confirming that the first map entry having the entry index '0' is stored in the new map table as the so-far-added/merged map entry, the memory system 110 can determine whether the first map entry having the entry index '0' can be a target map entry for the second map entry having the entry index '1'.

The memory system 110 can recognize that the first map entry having the entry index '0' and the second map entry having the entry index '1' are not continuous with each other, but partially overlapped with each other because the first map entry having the entry index '0' and the second map entry having the entry index '1' can include map information regarding the logical address LBA of '1'. Also, as described with reference to FIG. 6C, the memory system 110 may determine that the second map entry having the entry index '1' may be combined with, or merged into, the first map entry having the entry index '0'. The memory system 110 can combine or merge the first map entry having the entry index '0' and the second map entry having the entry index '1' to generate a combined or merged map entry. Here, in the combined or merged map entry, a start logical address SLBA may be '0' and the number of consecutive logical addresses NLB may be '4'.

Figure 9:
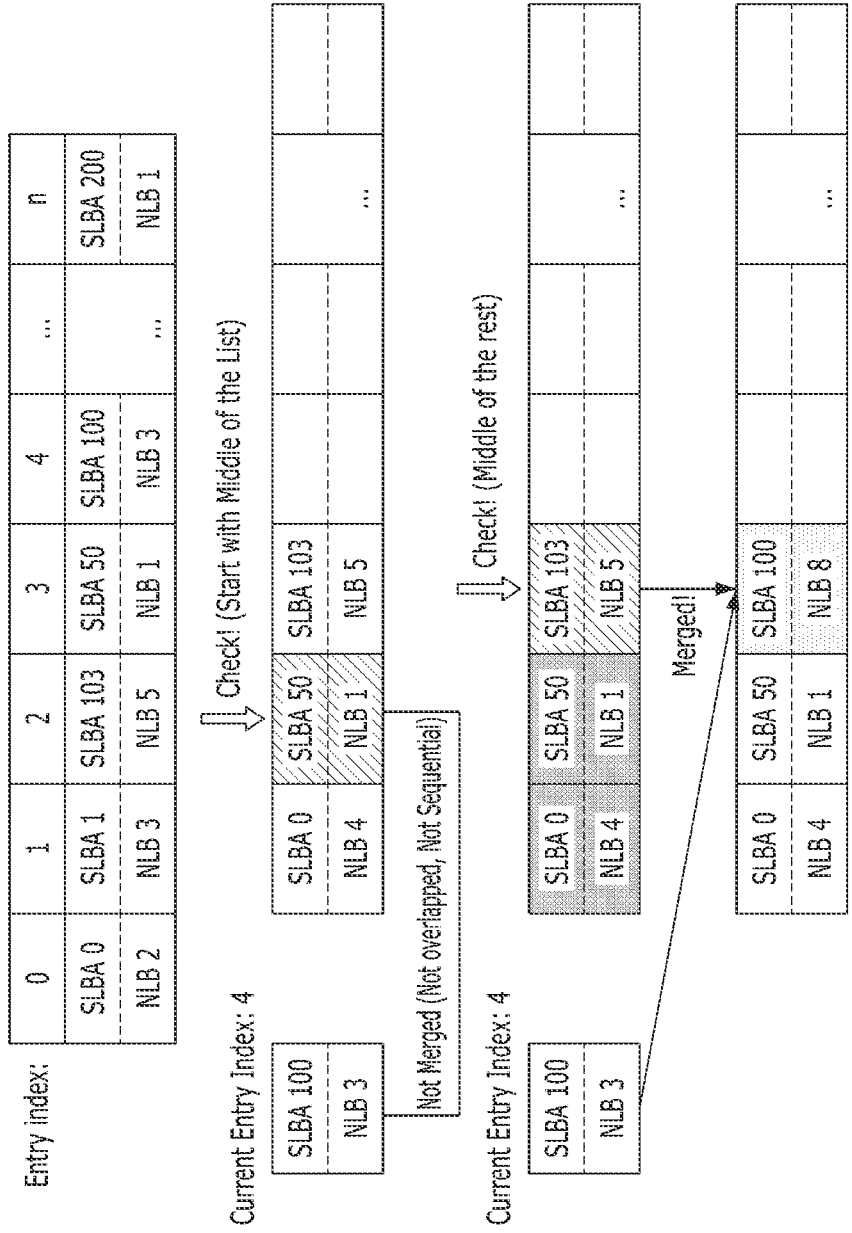
FIG. 9 illustrates a second example of merging map entries in a memory system according to an embodiment of the present disclosure.

FIG. 9 illustrates a second example of merging map entries in a memory system according to an embodiment of the present disclosure.

Referring to FIG. 9, a L2P map table stored in the memory device 150 includes (n+1) map entries. Further, a procedure for reconfiguring the L2P map table has been performed from a first map entry having the entry index '0' to a fourth map entry having the entry index '3', and the fifth map entry having the entry index '4' is a current map entry. Like a case described in FIG. 8, when the second map entry having the entry index '1' is a current map entry, the memory system can determine that the second map entry having the entry index '1', i.e., the current map entry can be combined with or merged into the first map entry having the entry index '0' which is a so-far-added/merged map entry in a new map table. Thus, the first map entry having the entry index '0' and the second map entry having the entry index '1' can be combined or merged so that a combined or merged map entry having a start logical address SLBA '0' and the number of consecutive logical addresses NLB '4' is stored in a new map table. But, a third map entry having the entry index '2' and the fourth map entry having the entry index '3' are not combined or merged with any of the so-far-added/merged map entry, so that the third map entry having the entry index '2' and the fourth map entry having the entry index '3' are added to the new map table individually as they are. In addition, because a logical address of the fourth map entry having the entry index '3' is ahead of that of the third map entry having the entry index '2', the fourth map entry having the entry index '3' can be stored at a location preceded by the third map entry having the entry index '2'. According to an embodiment, addition of a fourth map entry having the entry index '3' is performed by operations of shifting the third map entry having the entry index '2' to secure an empty space and inserting the fourth map entry having the entry index '3' into the empty space.

According to an embodiment, for the fifth map entry having the entry index '4' which is the current map entry, the memory system 110 may determine whether the second map entry corresponding to ½ of three so-far-added/merged map entries in the new map table is a target map entry. In the second map entry, a start logical address SLBA is '50' and the number of logical addresses NLB is '1'. But, a start logical address SLBA of the fifth map entry having the entry index '4' is '100'. Because the logical addresses of those map entries are neither continuous nor at least partially overlapped with each other, the fifth map entry having the entry index '4' and the second so-far-added/merged map entry in the new map table could not be combined or merged.

Because the start logical address SLBA of the current map entry, the fifth map entry having the entry index '4', is behind the start logical address SLBA of the second so-far-added/merged map entry, the memory system 110 can compare the fifth map entry having the entry index '4' with a third so-far-added/merged map entry in the new map table (e.g., ¾ position of the so-far-added/merged map entries). The start logical address SLBA of the fifth map entry having the entry index '4' is '100', the number of consecutive logical addresses NLB is '3', but the third so-far-added/merged map entry has a start logical address SLBA of '103' and the number of consecutive logical addresses NLB of '5'. Therefore, the memory system can determine that the fifth map entry having the entry index '4' and the third so-far-added/merged map entry can be continuous with each other. The memory system 110 can combine or merge the fifth map entry having the entry index '4' and the third so-far-added/merged map entry to generate a combined or merged map entry. The combined or merged map entry may have a start logical address SLBA of '100' and the number of consecutive logical addresses NLB of '8'.

Figure 10:
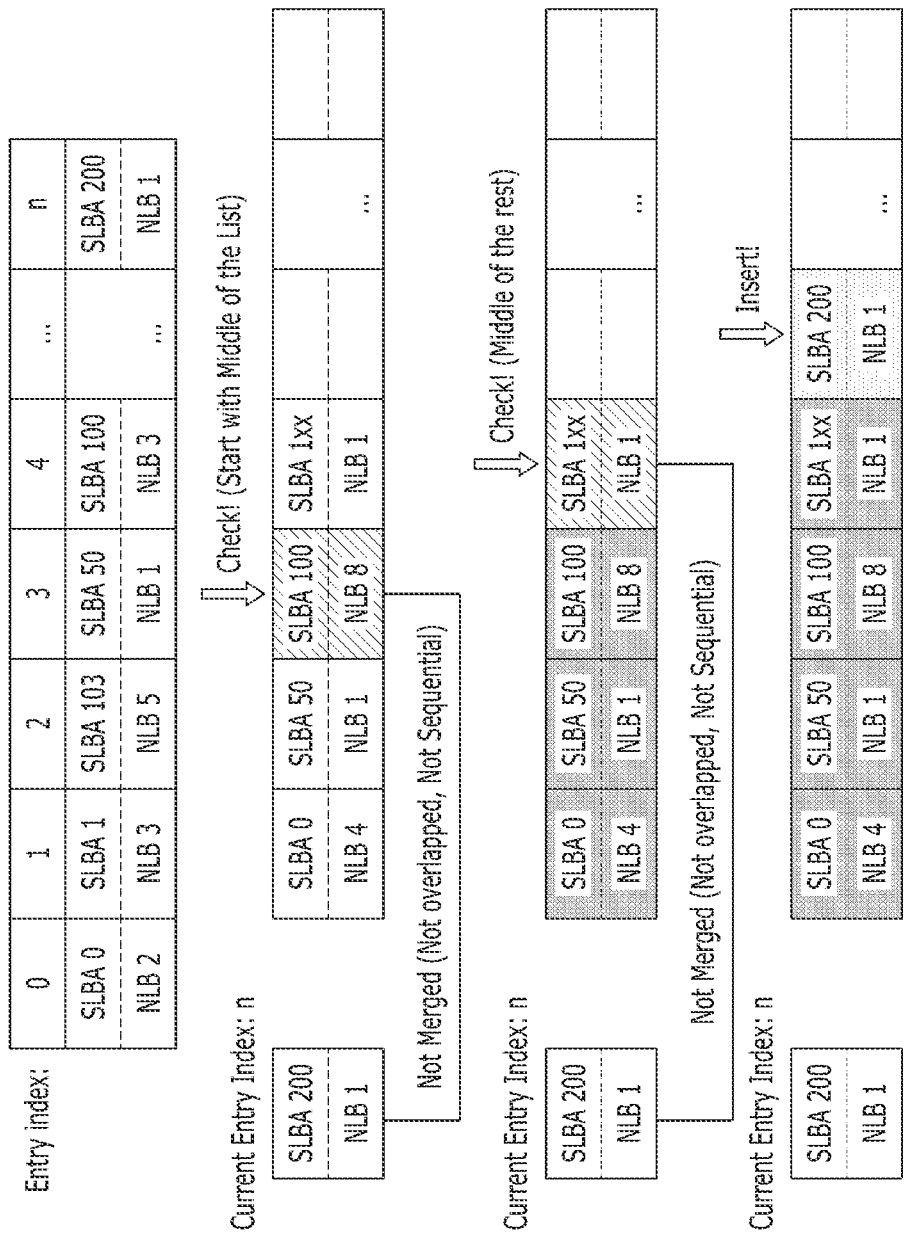
FIG. 10 illustrates a third example of merging map entries in a memory system according to an embodiment of the present disclosure.

FIG. 10 illustrates a third example of merging map entries in a memory system according to an embodiment of the present disclosure.

Referring to FIG. 10, a L2P map table stored in the memory device 150 includes (n+1) map entries. During a procedure for reconfiguring the L2P map table, the last map entry of the entry index 'n' is a current map entry. Referring to FIGS. 7 and 8, a second map entry having the entry index '1' can be combined with or merged into a first map entry having the entry index '0', and a fifth map entry having the entry index '5' can be combined with or merged into a third map entry of the entry index '2'. There are two cases for combining or merging map entries, so that four so-far-added/merged map entries can be stored in a new map table.

According to an embodiment, the memory system 110 may check whether there is a target map entry from the third so-far-added/merged map entry corresponding to a ½ position of the four so-far-added/merged map entries, when the last map entry having the entry index 'n' is the current map entry. Because a start logical address SLBA of the last map entry having the entry index 'n', which is the current map entry, is behind a start logical address SLBA of the third so-far-added/merged map entry, the memory system 110 can check whether the fourth so-far-added/merged map entry corresponding to a ¾ position of the four so-far-added/merged map entries is the target map entry. As a result, the memory system 110 may only check whether the third so-far-added/merged map entry and the fourth so-far-added/merged map entry in the new map table are the target map entry that can be combined with or merged into the current map entry. Referring to FIG. 10, the last map entry having the entry index 'n' might be neither continuous nor at least partially overlapped with the third so-far-added/merged map entry or the fourth so-far-added/merged map entry. In this case, the memory system 110 may add the last map entry having the entry index 'n' to the end of the new map table.

Referring to FIGS. 7 to 10, when a current map entry is continuous or at least partially overlapped with any of the so-far-added/merged map entries, the memory system 110 can combine or merge the current map entry with or into any of so-far-added/merged map entries, even if the corresponding map entries are neither adjacent, next nor near to each other. Through this L2P map table configuration, the memory system 110 can efficiently manage and control the L2P map table. The memory system 110 can reduce overheads in an internal operation for a data input/output operation, thereby improving performance of a data input/output operation.

Figure 11:
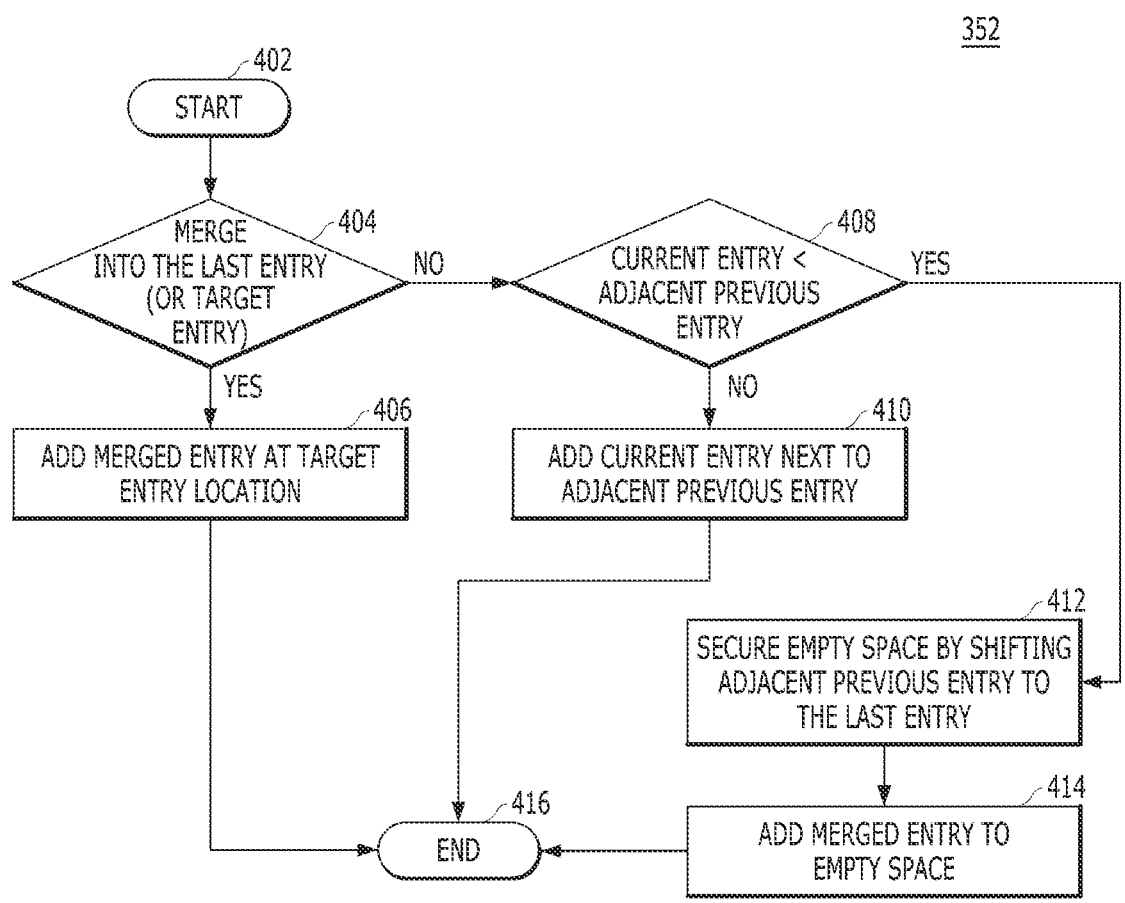
FIG. 11 illustrates a method for operating a memory system according to another embodiment of the present disclosure.

FIG. 11 illustrates a method for operating a memory system according to another embodiment of the present disclosure. The method for operating the memory system shown in FIG. 11 will be described in more detail with an operation of combining or merging a current map entry and a target map entry and adding the current map entry or a combined or merged map entry into the map table (operation 352 described in FIG. 7).

Referring to FIG. 11, a method for operating a memory system includes checking whether a current map entry can be combined with or merged into a target map entry (or the last compared map entry) (operation 404), and adding the combined or merged map entry to a position of the target map entry in the map data (operation 406). As described with reference to FIG. 7, the memory system 110 may perform a binary search on so-far-added/merged map entries in the map table to find the target map entry. According to an embodiment, after finding the target map entry, the memory system 110 can combine or merge the current map entry and the target map entry, and then insert the combined or merged map entry into a position of the target map entry in the map table.

However, when the memory system 110 does not find the target map entry, the memory system 110 could determine where to add the current map entry in the map table. To support a subsequent binary search, a position of the current map entry in the map can be determined such that the so-far-added/merged map entries are arranged in the map table in an ascending order of start logical addresses thereof. The method for operating the memory system may further include comparing a start logical address of the current map entry with that of a so-far-added/merged map entry next or adjacent to the last compared map entry when the current map entry is neither combined with nor merged into the last compared map entry (operation 408).

When the start logical address of the current map entry is ahead of the start logical address of a next or adjacent so-far-added/merged map entry, the method for operating the memory system includes securing an empty space by shifting all of the next or adjacent so-far-added/merged map entry to the last so-far-added/merged map entry (operation 412), and inserting the current map entry in the empty space (operation 414).

When the start logical address of the current map entry is behind the start logical address of the next or adjacent so-far-added/merged map entry, the method of operating the memory system may include adding the current map entry at a position following the next or adjacent so-far-added/merged map entry (operation 410). Although not shown, if there is currently no more space for the current map entry in the new map table, all of the so-far-added/merged map entry to the last so-far-added/merged map entry can be moved or shifted to secure an empty space for inserting the current map entry. After securing the empty space, the current map entry can be added to the empty space in the map table.

When a combined or merged map entry is added into the location of the target map entry (operation 406), a current map entry is inserted into the empty space (operation 414), or the current map entry is added after the so-far-added/merged map entry (operation 410), the memory system 110 can add the current map entry or the combined or merged map entry in the map table. Then, all so-far-added/merged map entries in the map table can be arranged in the map table in an ascending order of start logical addresses thereof.

Figure 12:
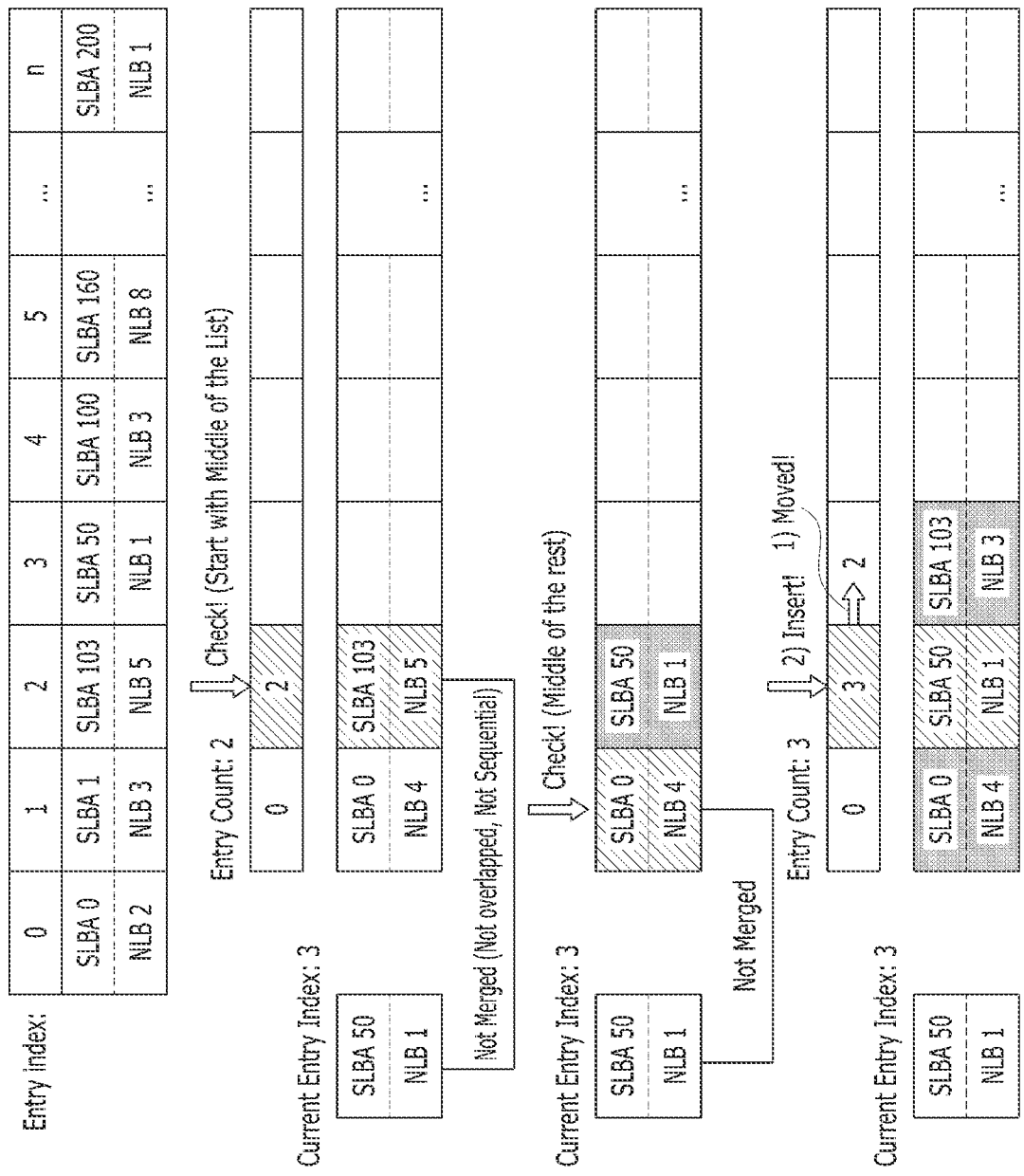
FIG. 12 illustrates a first example of inserting a map entry in a memory system according to an embodiment of the present disclosure.

FIG. 12 illustrates a first example of inserting a map entry in a memory system according to an embodiment of the present disclosure.

Referring to FIG. 12, a L2P map table stored in the memory device 150 includes (n+1) map entries. A procedure for reconfiguring the L2P map table has been performed from a first map entry having the entry index '0' to a third map entry having the entry index '2', and a fourth map entry having the entry index '3' becomes a current map entry. Like a case described in FIG. 8, when the second map entry having the entry index '1' is a current map entry, the memory system can determine that the second map entry having the entry index '1', i.e., the current map entry can be combined with or merged into the first map entry having the entry index '0' which is a so-far-added/merged map entry in a new map table. Thus, the first map entry having the entry index '0' and the second map entry having the entry index '1' can be combined or merged so that a combined or merged map entry having the start logical address SLBA '0' and the number of consecutive logical addresses NLB '4' is stored in the new map table. But, a third map entry having the entry index '2' and the fourth map entry having the entry index '3' are not combined or merged with any of the so-far-added/merged map entry, so that the third map entry having the entry index '2' and the fourth map entry having the entry index '3' are added to the new map table individually as they are.

The memory system 110 may compare the fourth map entry having the entry index '3' with the second so-far-added/merged map entry. A start logical address SBLA of the fourth map entry having the entry index '3' is '50'. Because a start logical address SLBA of the second so-far-added/merged map entry is '103', and the number of consecutive logical addresses NLB is '5.', the fourth map entry having the entry index '3' might be neither combined with nor merged into the second so-far-added/merged map entry.

Meanwhile, the start logical address SBLA of '50' in the fourth map entry having the entry index '3', is ahead of the start logical address SLBA of '103' in the second so-far-added/merged map entry. Accordingly, the memory system 110 could insert the fourth map entry having the entry index '3' before, not after, the second so-far-added/merged map entry.

The memory system 110 may compare the fourth map entry having the entry index '3' with the first so-far-added/merged map entry. The start logical address SBLA of '50' in the fourth map entry having the entry index '3' is behind the start logical address SLBA of '0' in the first so-far-added/merged map entry, so that two map entries could be not combined or merged. Further, the fourth map entry having the entry index '3' could be inserted after the first so-far-added/merged map entry. Accordingly, in order to insert the fourth map entry having the entry index '3' between the first and second so-far-added/merged map entries in the new map table, the memory system 110 may shift or move the second to the last so-far-added/merged map entries to secure an empty space. Then, the memory system 110 may add the fourth map entry having the entry index '3' to the reserved empty space.

Figure 13:
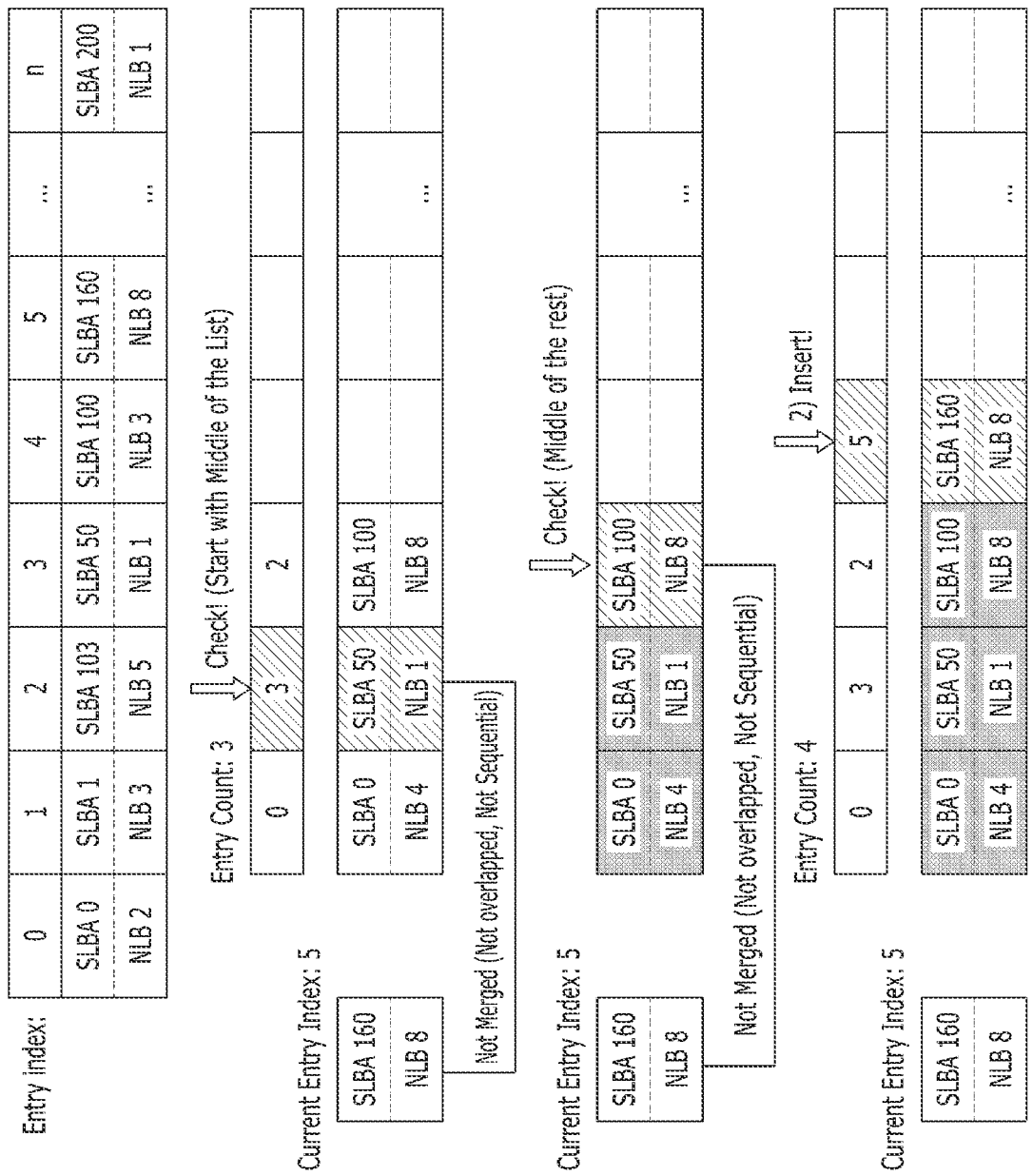
FIG. 13 illustrates a second example of inserting a map entry in a memory system according to an embodiment of the present disclosure.

FIG. 13 illustrates a second example of inserting a map entry in a memory system according to an embodiment of the present disclosure.

Referring to FIG. 13, a L2P map table stored in the memory device 150 includes (n+1) map entries. A procedure for reconfiguring the L2P map table has been performed from a first map entry having the entry index '0' to a fifth map entry having the entry index '4', and a sixth map entry having the entry index '5' becomes a current map entry. During the procedure for reconfiguring the L2P map table, a second map entry having the entry index '1' can be combined with or merged into a first map entry having the entry index '0', and a fifth map entry having the entry index '5' can be combined with or merged into a third map entry having the entry index '2'. There are two cases for combining or merging map entries, so that four so-far-added/merged map entries can be stored in a new map table.

The memory system 110 may check whether a sixth map entry having the entry index '5', which is a current map entry, and a second so-far-added/merged map entry, which is located at an intermediate position (½) of the new map table, are combined or merged. Herein, a start logical address SBLA of the sixth map entry having the entry index '5' is '150', and the second so-far-added/merged map entry has a start logical address SLBA of '50' and the number of consecutive logical addresses NLB of '1'. The memory system 110 may determine that the sixth map entry having the entry index '5' and the second so-far-added/merged map entry cannot be combined or merged.

Then, the memory system 110 may check whether a sixth map entry having the entry index '5', which becomes a current map entry, and a third so-far-added/merged map entry in the new map table are combined or merged. Because a start logical address SBLA of the sixth map entry of the entry index '5' is '150' and the third so-far-added/merged map entry has a start logical address SLBA of '100' and the number of consecutive logical addresses NLB of '8', the memory system 110 may determine that the sixth map entry having the entry index '5' and the second so-far-added/merged map entry cannot be combined or merged.

In addition, the memory system 110 may also recognize that the start logical address SBLA of the sixth map entry having the entry index '5' is behind those of not only the second so-far-added/merged map entry but also the third so-far-added/merged map entry. Accordingly, the memory system 110 may add a sixth map entry having the entry index '5' into a position after the third so-far-added/merged map entry in the new map table.

Referring to FIGS. 11 to 13, the memory system 110 may sort map entries in the new map table based on a start logical address SLBA in a procedure for reconfiguring the L2P map table. Through this, the memory system 110 may more efficiently perform a reconfiguration operation for the L2P map table, which may be repeated later based on another map entry. For example, if the map entries are sorted based on the start logical address SLAB when the L2P map table is reconfigured, the memory system 110 can reduce the resources consumed in a process of searching for the target map entry corresponding a current map entry.

According to an embodiment of the present disclosure, the memory system may improve data input/output performance by merging or combining map entries stored in the cache memory or volatile memory used by the controller.

According to an embodiment of the present disclosure, the memory system can effectively control map entries to be stored in a non-volatile memory device by reducing a process of reading, modifying or storing the map entries from or to the non-volatile memory device, so that an increase regarding program/erase cycles of the non-volatile memory device could be restrained as well as a lifespan of the non-volatile memory device could be made longer.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A controller which configures a map table including a map entry associating different address schemes with each other, the controller suitable for:
    searching previous map entries in the map table for a target map entry, wherein the target map entry and a current map entry include at least some information which is overlapped;
    merging the current map entry into the target map entry to generate a merged map entry when the target map entry is found; and
    adding the merged map entry in the map table,
    wherein the target map entry further includes at least some information which is continuous with that of the current map entry,
    wherein the controller searches for the target map entry by performing a sequential retrieval among a second half of the previous map entries when the previous map entries are not sorted in a logical address order, and
    wherein the controller searches for the target map entry by performing a binary search on the previous map entries when the previous map entries are sorted in the logical address order.

2. The controller according to claim 1, wherein the controller is further suitable for adding the current map entry in the map table when the target map entry is not found.

3. The controller according to claim 2, wherein the controller is further suitable for:
    comparing the current map entry with a specific previous map entry among the previous map entries;
    shifting all of the specific previous map entry to a last previous map entry among the previous map entries to secure an empty space when a logical address of the current map entry is ahead of that of the specific previous map entry; and
    inserting the current map entry into the empty space.

4. The controller according to claim 3, wherein the controller is further suitable for inserting the current map entry into an empty space next to the specific previous map entry when a logical address of the specific previous map entry is ahead of that of the current map entry.

5. The controller according to claim 1, wherein the controller is suitable for configuring the map table in response to a trim command provided from a host.

6. The controller according to claim 1, wherein the controller is suitable for configuring the map table when the map table has no available space for a new map entry or when the new map entry is added to the map table.

7. The controller according to claim 1, wherein the controller is suitable for storing the map table in a non-volatile memory device after configuring the map table.

8. A memory system, comprising:
    a memory device configured to store or output data based on a first address scheme;
    a controller configured to receive or output the data based on a second address scheme which is different from the first address scheme, and configure a map table including a map entry by associating the first and second address schemes with each other,
    wherein the controller is suitable for:
    searching previous map entries in the map table for a target map entry, wherein the target map entry and a current map entry include at least some information which is overlapped;
    merging the current map entry into the target map entry to generate a merged map entry when the target map entry is found; and
    adding the merged map entry in the map table,
    wherein the target map entry further includes at least some information which is continuous with the current map entry,
    wherein the controller searches for the target map entry by performing a sequential retrieval among a second half of the previous map entries when the previous map entries are not sorted in a logical address order, and
    wherein the controller searches for the target map entry by performing a binary search on the previous map entries when the previous map entries are sorted in the logical address order.

9. The memory system according to claim 8, wherein the controller is further suitable for adding the current map entry in the map table when the target map entry is not found.

10. The memory system according to claim 9, wherein the controller is further suitable for:
    comparing the current map entry with a specific previous map entry among the previous map entries;
    shifting all of the specific previous map entry to a last previous map entry among the previous map entries to secure an empty space when a logical address of the current map entry is ahead of that of the specific previous map entry; and
    inserting the current map entry into the empty space.

11. The memory system according to claim 10, wherein the controller is further suitable for inserting the current map entry into an empty space next to the specific previous map entry when a logical address of the specific previous map entry is ahead of that of the current map entry.

12. The memory system according to claim 8, wherein the controller is suitable for configuring the map table in response to a trim command provided from a host.

13. The memory system according to claim 8, wherein the controller is suitable for configuring the map table when the map table has no available space for a new map entry or when the new map entry is added to the current map table.

14. The memory system according to claim 8, wherein the controller is suitable for storing the map table in a non-volatile memory device after configuring the map table.

15. A method for operating a memory system comprising a memory device configured to store or output data based on a first address scheme, and a controller configured to receive or output the data based on a second address scheme which is different from the first address scheme, and configure a map table including a map entry associating the first and second address schemes with each other, the method comprising:

searching previous map entries in the map table for a target map entry, wherein the target map entry and a current map entry include at least some information which is overlapped;

merging the current map entry into the target map entry to generate a merged map entry when the target map entry is found; and adding the merged map entry in the map table, wherein the target map entry further includes at least some information which is continuous with that of the current map entry, and wherein the searching for the target map entry comprises at least one of:

performing a sequential retrieval among a second half of the previous map entries when the previous map entries are not sorted in a logical address order, or performing a binary search on the previous map entries when the previous map entries are sorted in logical address order.

16. The method according to claim 15, further comprising adding the current map entry in the map table when the target map entry is not found.

17. The method according to claim 16, wherein the adding the current map entry comprises:

comparing the current map entry with a specific previous map entry among the previous map entries;

shifting all of the specific previous map entry to a last previous map entry among the previous map entries to secure an empty space and inserting the current map entry into the empty space, when a logical address of the current map entry is ahead of that of the specific previous map entry; and inserting the current map entry into an empty space next to the specific map entry when a logical address of the specific previous map entry is ahead of that of the current map entry.

\* \* \* \* \*